UNITED STATES PATENT OFFICE.

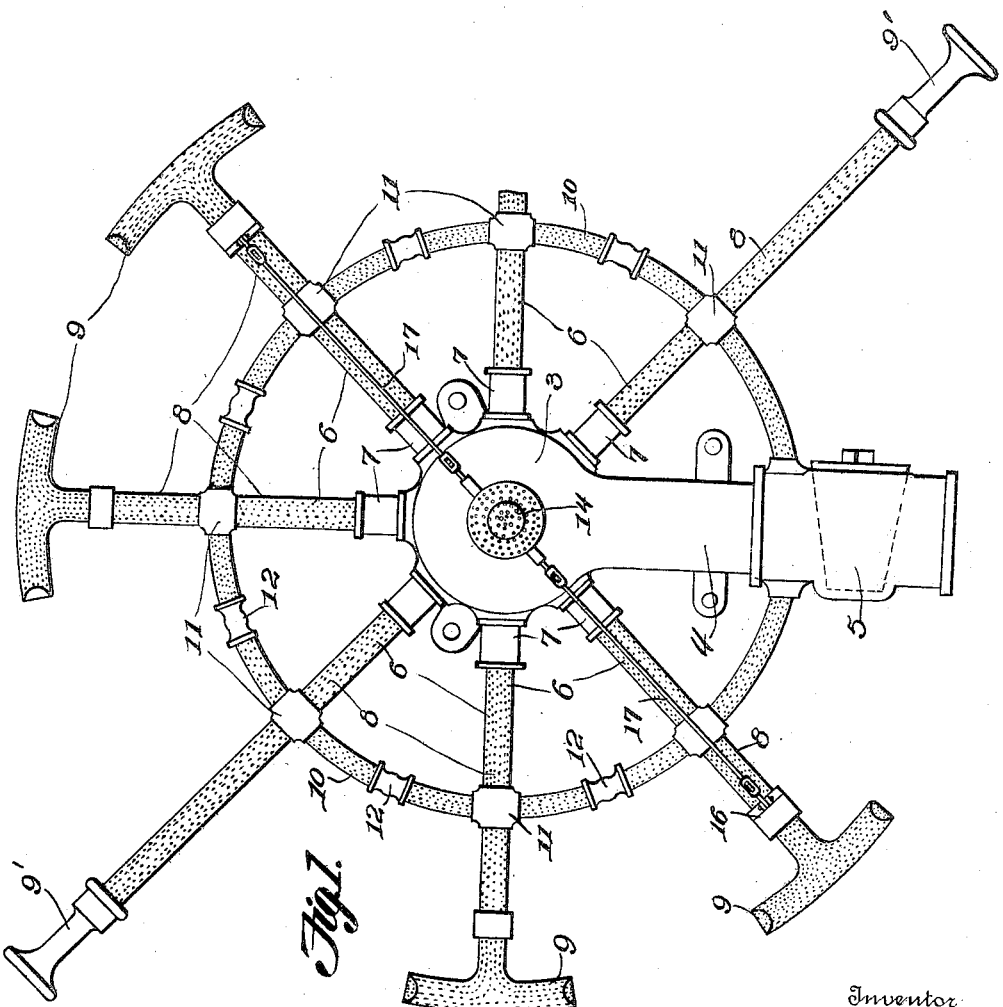

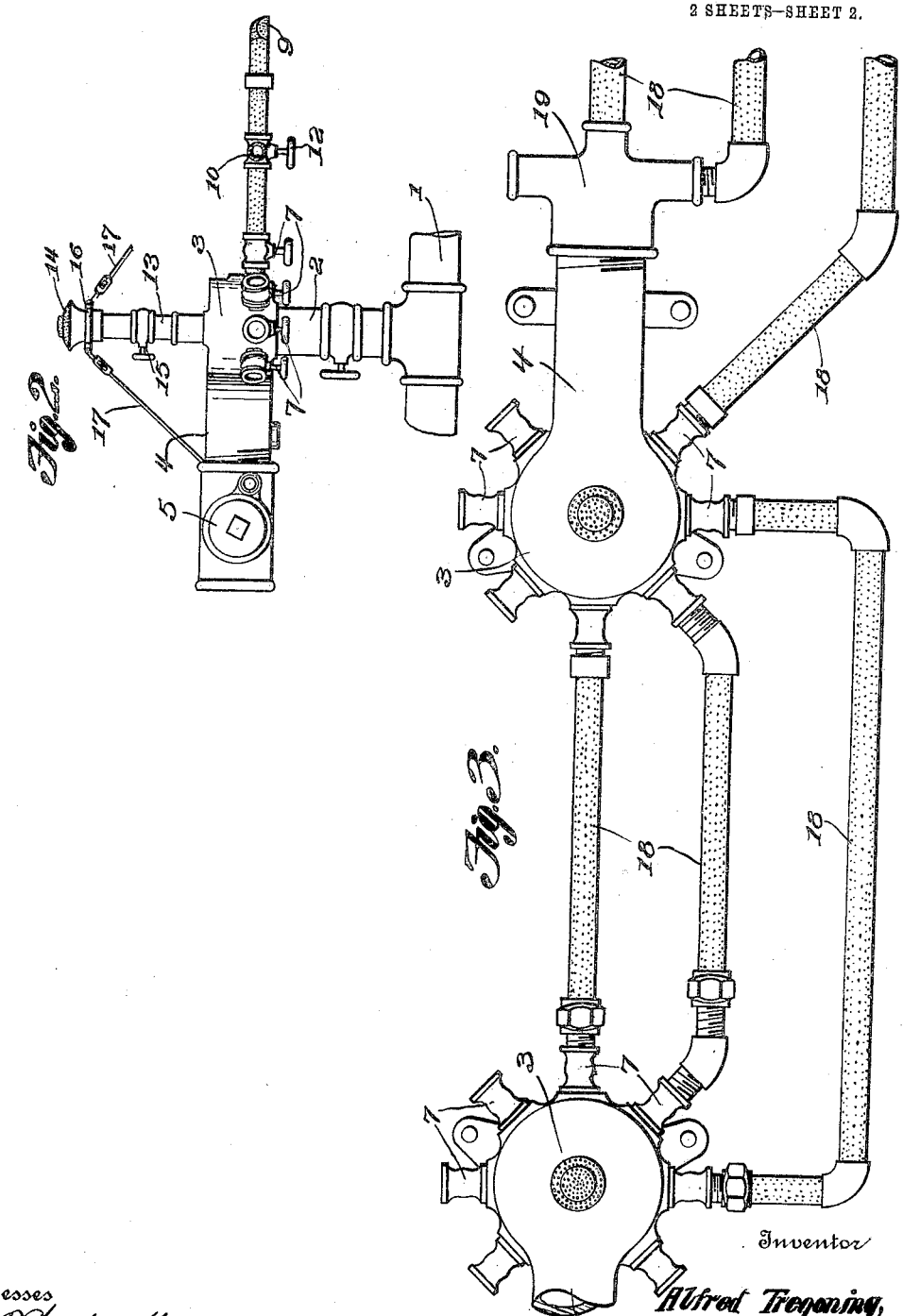

ALFRED TREGONING, OF LOS ANGELES, CALIFORNIA.

IRRIGATING SYSTEM.

1,104,580.

Specification of Letters Patent. Patented July 21, 1914.

Application filed July 31, 1911. Serial No. 641,686.

*To all whom it may concern:*

Be it known that I, ALFRED TREGONING, a citizen of the United States, residing at Los Angeles, in the county of Los Angeles and State of California, have invented certain new and useful Improvements in Irrigating Systems; and I do hereby declare the following to be a full, clear, and exact description of the invention, such as will enable others skilled in the art to which it appertains to make and use the same.

This invention relates to an improvement in aerial, irrigating and sprinkling systems.

The purpose of this invention is to provide an improved system of this character which may irrigate the crops or sprinkle a yard or small park.

A further object of this invention is the novel arrangement of pipes provided with nozzles which may be used to irrigate the land and which are provided with valves, whereby a portion of the land may be irrigated at the time by the joint or several use of the different sections.

With these and other objects in view, my invention consists of a novel construction, combination, formation and arrangement of parts which will be hereinafter fully described, claimed and particularly pointed out in the drawing in which:

Figure 1 is a top plan view of one form of the sprinkling device which is used for sprinkling lawns or small parkings showing the radially projected extensions at different lengths; Fig. 2 is a side elevation of the same on a reduced scale showing the perforated circular pipe for connecting the radial pipes broken away; Fig. 3 is a plan view of two of the sprinkling devices connected by horizontal extensions showing the sprinkling pipes applied for sprinkling large areas of land.

Referring now more particularly to the drawings wherein I have illustrated the device for irrigating land, the numeral 1 indicates a water main which is suitably placed around the fields to be irrigated and has coupled thereto aerially extending supporting water supply pipes 2. There may be as many of these supporting pipes as desired and properly spaced over the field and they may be of any height desired to sprinkle the crops. Coupled to the upper terminal of each of the supporting water supply pipes 2 is a distributing head 3 receiving water from the main 1 through the respective pipe 2. This distributing head 3 is circular in form and has extending therefrom a horizontal outlet pipe 4 provided with a valved fitting 5.

A plurality of sprinkling pipes 6 are suitably coupled to distributing head 3 and extend radially therefrom. Each of these radially extending pipes 6 is provided with a valve 7 and is perforated as at 8, and coupled to the end of each is a suitable nozzle 9 or 9'. These radially extending pipes 8 may be of any length desired to extend over the ground to be irrigated. Spaced from the distributing head 3 is a circular perforated pipe 10 which is suitably connected by couplings 11 to the radially extending pipes 8 and is perforated so that the ground around the supporting pipe 2 may be also irrigated. There may be as many of these circular pipes 10 as desired and each of them is provided with a valve 12 so that a portion of the ground may be irrigated at the time.

Extending perpendicularly from the center of the distributing head 3 and coupled thereto is a pipe 13 which is provided at the end with a suitable nozzle 14 and has a valve 15 for regulating the flow of water to the said nozzle. Suitably secured to the radially extending pipes 8 and the vertical pipe 13 are collars 16 which are connected by cables 17 thereby forming a suitable support for the radially extending pipes 8. In irrigating a yard or a small park only one of these distributing heads 3 is used, but in irrigating large farms or lawns there may be as many of these distributing heads as desired and to form a suitable connection between them I provide pipes 18 which are also perforated to take the place of the radially extending pipes 8 whereby the land between the said aerial extending supporting pipes 2 may be also irrigated. To connect the horizontal outlet pipe 4 of the distributing head 3 I provide a valveless fitting 19 whereby certain of the pipes 18 may be suitably connected to the outlet pipe 4 which supplies water to the said pipes 18 from the distributing head 3. When the distributing head 3 is to be used as shown in Figs. 1 and 2, the free end of the outlet pipe 4 has detachably secured thereto the valved fitting 5; while for sprinkling larger tracts this valved fitting 5 is replaced by the valveless fitting 19 which is provided with a plurality of discharge nipples adapted to be connected with sprinkling pipes 18 as shown in Fig. 3.

It is obvious from the foregoing description that from the structure presented portions of the field or the like may be irrigated or sprinkled as desired and when it is desired the system may be used as an insect destroyer by mixing the water with some kind of an insecticide.

Having described my invention what I claim as new and desire to secure by Letters Patent is:

1. In an irrigating system of the kind described, a water main, an aerially extending inlet pipe projecting upwardly from said main, a distributing head on its upper end, a plurality of sprinkling pipes connected to said head, a controlling valve in each of said sprinkling pipes, a valve controlling the flow of water through said aerially extending pipe from said main, a distributing nozzle communicating with said head and supported thereby at an elevated point, a valved outlet pipe radially connected with said head and a second set of sprinkling pipes connected to said outlet pipe.

2. In an irrigating system of the kind described, a water main, an aerially extending inlet pipe connected with said water main, a distributing head at the upper end thereof, a valve controlling the flow of water from said main to said head, a distributing nozzle communicating with said head and supported thereby at an elevated point, a horizontal outlet pipe projecting from said distributing head and adapted at its free end to receive a pipe fitting, a plurality of radially extending sprinkling pipes connected with said distributing head, and fittings alternatively adapted to be applied to the free end of said outlet pipe, one of said fittings being provided with a valve and an oppositely disposed outlet in advance thereof, the other fitting being valveless and having a plurality of outlet nipples adapted for connection with sprinkling pipes.

3. In an irrigating system, the combination with a water main, of a plurality of vertically disposed inlet pipes connected with said main, distributing heads respectively mounted on the upper terminals of said vertical pipes, a vertically disposed pipe mounted on the upper terminal of each of said distributing heads, nozzles respectively mounted on the upper terminals of said last mentioned vertically disposed pipes, and horizontally disposed sets of sprinkling pipes connecting adjacent distributing heads.

In testimony whereof I affix my signature in presence of two witnesses.

ALFRED TREGONING.

Witnesses:
JAMES S. GREEN,
JEANNETTE A. STORTZ.

Copies of this patent may be obtained for five cents each, by addressing the "Commissioner of Patents, Washington, D. C."